US012578890B2

(12) United States Patent
Birgade et al.

(10) Patent No.: US 12,578,890 B2
(45) Date of Patent: Mar. 17, 2026

(54) BLOCK REPLACEMENT USING COMBINED BLOCKS

(71) Applicant: Micron Technology, Inc., Boise, ID (US)

(72) Inventors: Nikhil Birgade, Hyderabad (IN); Uday Bhasker V. Vudugandla, Hyderabad (IN); Mani Raghavendra Aravapalli, Hyderabad (IN)

(73) Assignee: Micron Technology, Inc., Boise, ID (US)

( * ) Notice: Subject to any disclaimer, the term of this patent is extended or adjusted under 35 U.S.C. 154(b) by 93 days.

(21) Appl. No.: 18/438,155

(22) Filed: Feb. 9, 2024

(65) Prior Publication Data

US 2024/0289042 A1      Aug. 29, 2024

Related U.S. Application Data

(60) Provisional application No. 63/447,836, filed on Feb. 23, 2023.

(51) Int. Cl.
*G06F 3/06* (2006.01)

(52) U.S. Cl.
CPC ............ *G06F 3/064* (2013.01); *G06F 3/0619* (2013.01); *G06F 3/0673* (2013.01)

(58) Field of Classification Search
CPC ...... G06F 3/064; G06F 3/0619; G06F 3/0673; G06F 3/0679
See application file for complete search history.

(56) References Cited

U.S. PATENT DOCUMENTS

| | | | | |
|---|---|---|---|---|
| 2018/0366210 | A1* | 12/2018 | Park | G11C 29/886 |
| 2020/0073573 | A1* | 3/2020 | Park | G11C 29/70 |
| 2021/0042201 | A1* | 2/2021 | Byun | G06F 11/2094 |
| 2021/0333999 | A1* | 10/2021 | Park | G06F 3/064 |
| 2023/0069423 | A1* | 3/2023 | Chung | G06F 3/0679 |

\* cited by examiner

*Primary Examiner* — Sean D Rossiter
(74) *Attorney, Agent, or Firm* — Holland & Hart LLP

(57) ABSTRACT

Methods, systems, and devices for block replacement using combined blocks are described. A memory system may receive a command to perform an access operation on a block of the memory system. The memory system may determine whether a block pool includes a second block configured to replace the block based on a failure to perform the access operation. The memory system may generate a combined block for replacing the block based on determining an absence of the second block in the block pool. The combined block may be generated by combining two half good blocks (HGBs) in a same plane of the memory system as the block. In some cases, a second block pool may be generated and the combined block may be stored to the second block pool. The memory system may select the combined block from the second block pool and replace the block with the combined block.

20 Claims, 5 Drawing Sheets

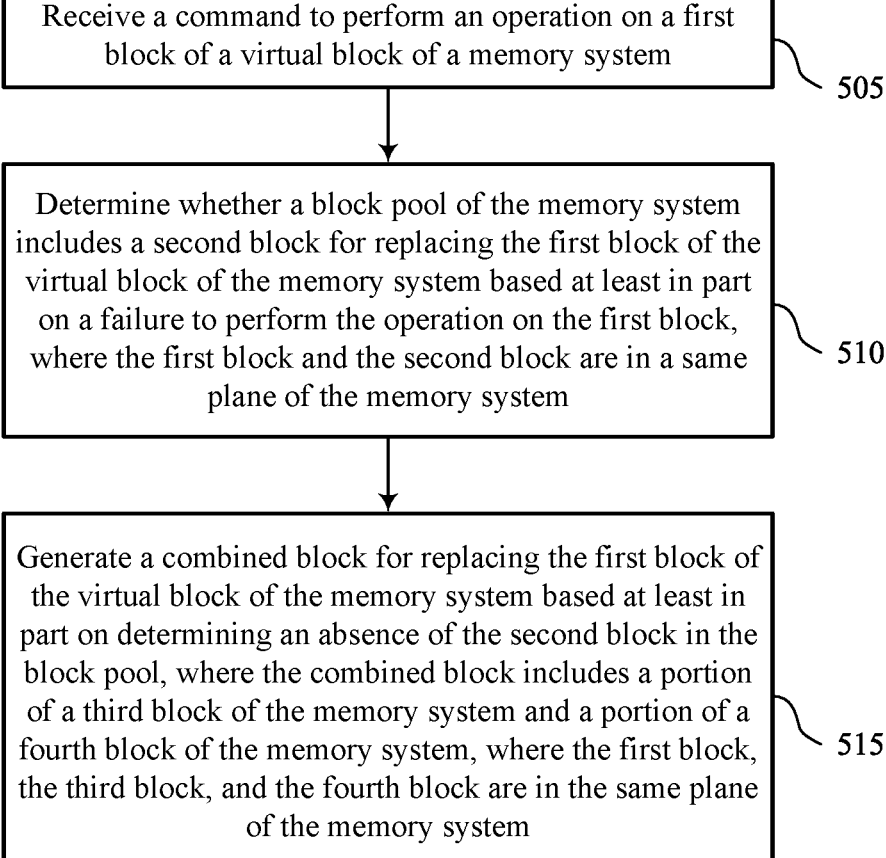

Receive a command to perform an operation on a first block of a virtual block of a memory system — 505

Determine whether a block pool of the memory system includes a second block for replacing the first block of the virtual block of the memory system based at least in part on a failure to perform the operation on the first block, where the first block and the second block are in a same plane of the memory system — 510

Generate a combined block for replacing the first block of the virtual block of the memory system based at least in part on determining an absence of the second block in the block pool, where the combined block includes a portion of a third block of the memory system and a portion of a fourth block of the memory system, where the first block, the third block, and the fourth block are in the same plane of the memory system — 515

BLOCK REPLACEMENT USING COMBINED BLOCKS

TECHNICAL FIELD

The present application for Patent claims priority to and the benefit of U.S. Provisional Application No. 63/447,836 by Birgade et al., entitled "BLOCK REPLACEMENT USING COMBINED BLOCKS," filed Feb. 23, 2023, assigned to the assignee hereof, and is expressly incorporated by reference in its entirety herein.

TECHNICAL FIELD

The following relates to one or more systems for memory, including block replacement using combined blocks.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states in response to being disconnected from an external power source.

BRIEF DESCRIPTION OF THE DRAWINGS

FIG. 5 illustrates a flowchart showing a method or methods that support block replacement using combined blocks in accordance with examples as disclosed herein.

DETAILED DESCRIPTION

Figure 1:
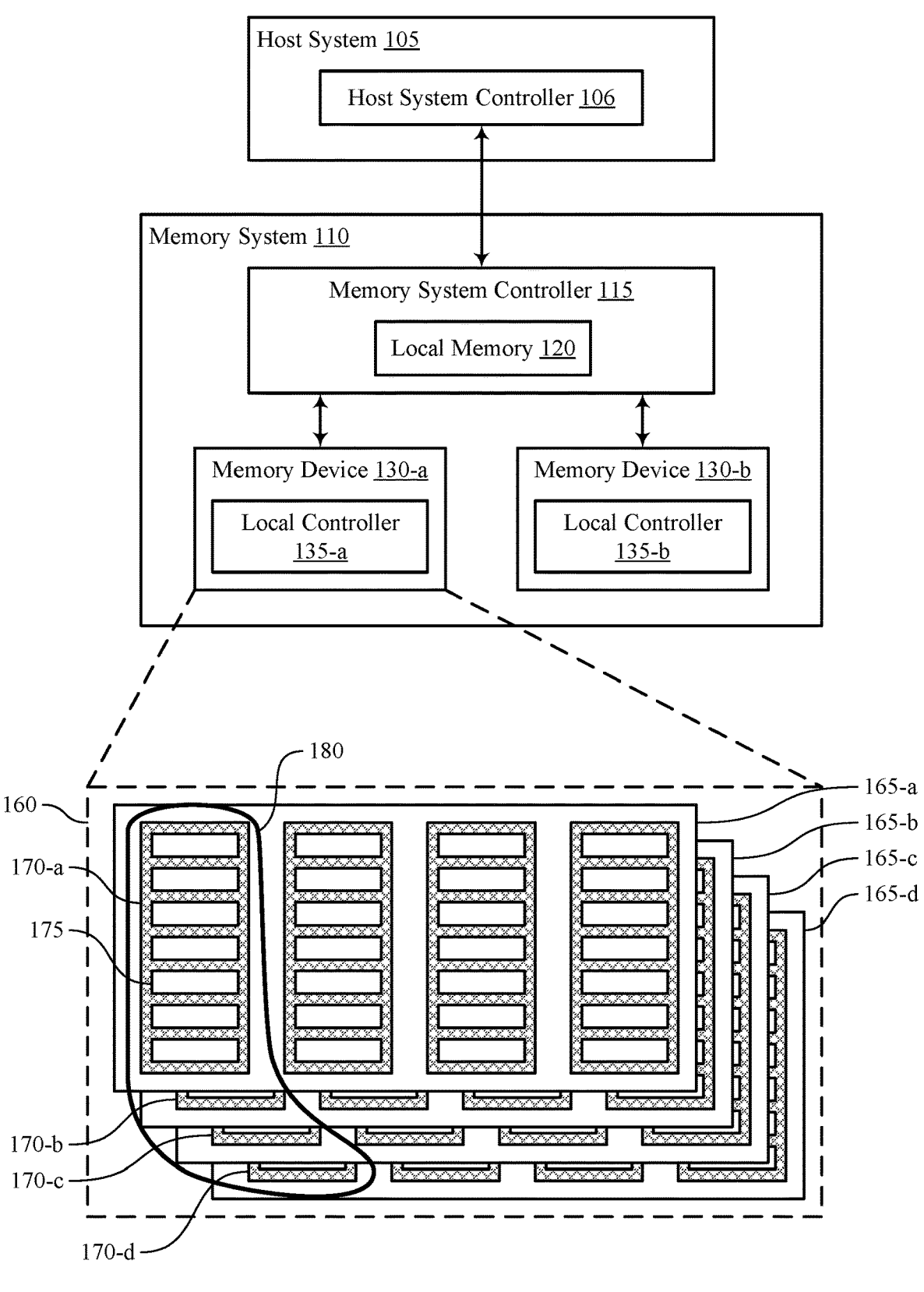
FIG. 1 illustrates an example of a system that supports block replacement using combined blocks in accordance with examples as disclosed herein.

A memory system may include one or more memory devices (e.g., memory dies) including non-volatile memory (e.g., NAND memory). For example, the one or more memory devices may include blocks of memory cells (e.g., non-volatile memory cells) configured to store data accessible via access operations (e.g., among other access operations). In some cases, the memory system may support replacement of bad blocks (e.g., blocks associated with a quantity of access failures satisfying a threshold) with good blocks (e.g., blocks associated with a quantity of access failures not satisfying a threshold). For example, replacing a bad block may include identifying a good block from a same plane of the one or more memory devices as the bad block by referencing a block pool (e.g., a replacement table including mapping information for good blocks), copying valid data from the bad block to the good block, and mapping (e.g., logically mapping) the good block (e.g., and unmapping the bad block) to a same virtual block (e.g., a group of blocks spanning the planes of the one or more memory devices) as the bad block. However, in some cases, the memory system may identify whether there are (e.g., an absence of) good blocks in the block pool, such that no good blocks may exist in the one or more memory dies to replace the bad blocks. In some such cases, the one or more memory devices may enter an end of life (EOL) state, in which the one or more memory devices may switch to a read-only mode, such that no additional write operations may be performed on the one or more memory devices.

In accordance with examples as disclosed herein, the memory system may support generating combined blocks using half good blocks (HGBs) of the one or more memory devices (e.g., blocks including functional word lines in a respective region of the blocks) and replacing the bad blocks with the combined blocks. For example, the memory system may construct (e.g., logically) a combined block using an upper HGB (e.g., a block with functional word lines in an upper region of the block) of the one or more memory devices and a lower HGB (e.g., a block with functional word lines in a lower region of the block) of the one or more memory devices. In some cases, the memory system may generate the combined blocks to replace the bad blocks based on (e.g., in response to) identifying the absence of good blocks in the block pool. In some such cases, the memory system may support creating a second block pool (e.g., a second replacement table including mapping information for combined blocks) configured to store the combined blocks, and the memory system may select the combined blocks from the second block pool to replace the bad blocks. By supporting replacing bad blocks with combined blocks, the memory system may benefit from a relatively greater duration before reaching the EOL state (e.g., compared to previous implementations), thereby preventing the one or more memory devices from switching to the read-only mode over the relatively greater duration, among other advantages.

Figure 2:
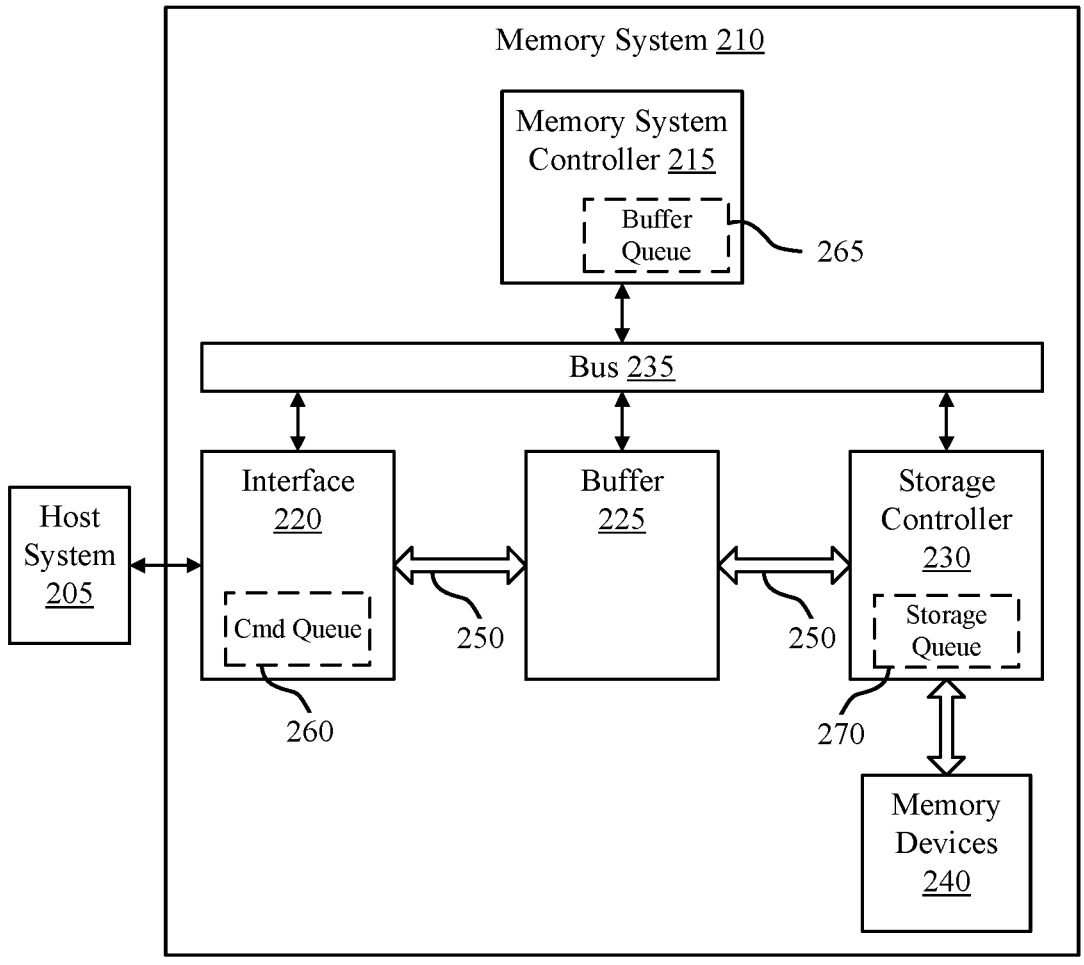
FIG. 2 illustrates an example of a system that supports block replacement using combined blocks in accordance with examples as disclosed herein.

Features of the disclosure are initially described in the context of systems, devices, and circuits with reference to FIGS. 1 and 2. Features of the disclosure are described in the context of a process flow with reference to FIG. 3. These and other features of the disclosure are further illustrated by and described in the context of an apparatus diagram and flowchart that relate to block replacement using combined blocks with reference to FIGS. 4 and 5.

FIG. 1 illustrates an example of a system 100 that supports block replacement using combined blocks in accordance with examples as disclosed herein. The system 100 includes a host system 105 coupled with a memory system 110. The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as disclosed herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as disclosed herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated, which may be due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support block replacement using combined blocks. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as disclosed herein.

In accordance with examples as disclosed herein, the memory system 110 may support generating combined blocks (e.g., blocks 170) using HGBs of the memory devices 130 (e.g., blocks including functional word lines in a respective region of the blocks) and replacing bad blocks (e.g., blocks associated with a quantity of access failures satisfying a threshold) with the combined blocks. For example, the memory system 110 may construct (e.g., logically) a combined block using an upper HGB (e.g., a block with functional word lines in an upper region of the block) of the memory devices 130 and a lower HGB (e.g., a block with functional word lines in a lower region of the block) of the memory devices 130. In some cases, the memory system 110 may generate the combined blocks to replace the bad blocks based on (e.g., in response to) an absence of good blocks (e.g., blocks associated with a quantity of access failures not satisfying a threshold) in a block pool (e.g., a replacement table). In some cases, the memory system 110 may support creating a second block pool configured to store the combined blocks, and the memory system 110 may select the combined blocks from the second block pool to replace the bad blocks. By supporting replacing bad blocks with combined blocks, the memory system 110 may benefit from a relatively greater duration before reaching an EOL state (e.g., compared to previous implementations), thereby preventing the memory devices 130 from switching to a read-only mode over the relatively greater duration.

FIG. 2 illustrates an example of a system 200 that supports block replacement using combined blocks in accordance with examples as disclosed herein. The system 200 may be an example of a system 100 as described with reference to FIG. 1, or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include one or more memory devices 240 to store data transferred between the memory system 210 and the host system 205 (e.g., in response to receiving access commands from the host system 205). The memory devices 240 may include one or more memory devices as described with reference to FIG. 1. For example, the memory devices 240 may include NAND memory, PCM, self-selecting memory, 3D cross point or other chalcogenide-based memories, FERAM, MRAM, NOR (e.g., NOR flash) memory, STT-MRAM, CBRAM, RRAM, or OxRAM, among other examples.

The memory system 210 may include a storage controller 230 for controlling the passing of data directly to and from the memory devices 240 (e.g., for storing data, for retrieving data, for determining memory locations in which to store data and from which to retrieve data). The storage controller 230 may communicate with memory devices 240 directly or via a bus (not shown), which may include using a protocol specific to each type of memory device 240. In some cases, a single storage controller 230 may be used to control multiple memory devices 240 of the same or different types. In some cases, the memory system 210 may include multiple storage controllers 230 (e.g., a different storage controller 230 for each type of memory device 240). In some cases, a storage controller 230 may implement aspects of a local controller 135 as described with reference to FIG. 1.

The memory system 210 may include an interface 220 for communication with the host system 205, and a buffer 225 for temporary storage of data being transferred between the host system 205 and the memory devices 240. The interface 220, buffer 225, and storage controller 230 may support translating data between the host system 205 and the memory devices 240 (e.g., as shown by a data path 250), and may be collectively referred to as data path components.

Using the buffer 225 to temporarily store data during transfers may allow data to be buffered while commands are being processed, which may reduce latency between commands and may support arbitrary data sizes associated with commands. This may also allow bursts of commands to be handled, and the buffered data may be stored, or transmitted, or both (e.g., after a burst has stopped). The buffer 225 may include relatively fast memory (e.g., some types of volatile memory, such as SRAM or DRAM), or hardware accelerators, or both to allow fast storage and retrieval of data to and from the buffer 225. The buffer 225 may include data path switching components for bi-directional data transfer between the buffer 225 and other components.

A temporary storage of data within a buffer 225 may refer to the storage of data in the buffer 225 during the execution of access commands. For example, after completion of an access command, the associated data may no longer be maintained in the buffer 225 (e.g., may be overwritten with data for additional access commands). In some examples, the buffer 225 may be a non-cache buffer. For example, data may not be read directly from the buffer 225 by the host system 205. In some examples, read commands may be added to a queue without an operation to match the address to addresses already in the buffer 225 (e.g., without a cache address match or lookup operation).

The memory system 210 also may include a memory system controller 215 for executing the commands received from the host system 205, which may include controlling the data path components for the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, a storage queue 270) may be used to control the processing of access commands and the movement of corresponding data. This may be beneficial, for example, if more than one access command from the host system 205 is processed concurrently by the memory system

210. The command queue 260, buffer queue 265, and storage queue 270 are depicted at the interface 220, memory system controller 215, and storage controller 230, respectively, as examples of a possible implementation. However, queues, if implemented, may be positioned anywhere within the memory system 210.

Data transferred between the host system 205 and the memory devices 240 may be conveyed along a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220 (e.g., according to a protocol, such as a UFS protocol or an eMMC protocol). Thus, the interface 220 may be considered a front end of the memory system 210. After receipt of each access command, the interface 220 may communicate the command to the memory system controller 215 (e.g., via the bus 235). In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved (e.g., by the memory system controller 215). In some cases, the memory system controller 215 may cause the interface 220 (e.g., via the bus 235) to remove the command from the command queue 260.

After a determination that an access command has been received, the memory system controller 215 may execute the access command. For a read command, this may include obtaining data from one or more memory devices 240 and transmitting the data to the host system 205. For a write command, this may include receiving data from the host system 205 and moving the data to one or more memory devices 240. In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. For example, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), which may be performed in accordance with a protocol (e.g., a UFS protocol, an eMMC protocol). As the interface 220 receives the data associated with the write command from the host system 205, the interface 220 may transfer the data to the buffer 225 for temporary storage using the data path 250. In some cases, the interface 220 may obtain (e.g., from the buffer 225, from the buffer queue 265) the location within the buffer 225 to store the data. The interface 220 may indicate to the memory system controller 215 (e.g., via the bus 235) if the data transfer to the buffer 225 has been completed.

After the write data has been stored in the buffer 225 by the interface 220, the data may be transferred out of the buffer 225 and stored in a memory device 240, which may involve operations of the storage controller 230. For example, the memory system controller 215 may cause the storage controller 230 to retrieve the data from the buffer 225 using the data path 250 and transfer the data to a memory device 240. The storage controller 230 may be considered a back end of the memory system 210. The storage controller 230 may indicate to the memory system controller 215 (e.g., via the bus 235) that the data transfer to one or more memory devices 240 has been completed.

In some cases, a storage queue 270 may support a transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain (e.g., from the buffer 225, from the buffer queue 265, from the storage queue 270) the location within the buffer 225 from which to obtain the data. The storage controller 230 may manage the locations within the memory devices 240 to store the data (e.g., performing wear-leveling, performing garbage collection). The entries may be added to the storage queue 270 (e.g., by the memory system controller 215). The entries may be removed from the storage queue 270 (e.g., by the storage controller 230, by the memory system controller 215) after completion of the transfer of the data.

To process a read command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the read command.

In some cases, the buffer queue 265 may support buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215 (e.g., via the bus 235) if the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain (e.g., from the buffer 225, from the storage queue 270) the location within one or more memory devices 240 from which to retrieve the data. In some cases, the storage controller 230 may obtain (e.g., from the buffer queue 265) the location within the buffer 225 to store the data. In some cases, the storage controller 230 may obtain (e.g., from the storage queue 270) the location within the buffer 225 to store the data. In some cases, the memory system controller 215 may move the command processed by the storage queue 270 back to the command queue 260.

Once the data has been stored in the buffer 225 by the storage controller 230, the data may be transferred from the buffer 225 and sent to the host system 205. For example, the memory system controller 215 may cause the interface 220 to retrieve the data from the buffer 225 using the data path 250 and transmit the data to the host system 205 (e.g., according to a protocol, such as a UFS protocol or an eMMC protocol). For example, the interface 220 may process the command from the command queue 260 and may indicate to the memory system controller 215 (e.g., via the bus 235) that the data transmission to the host system 205 has been completed.

The memory system controller 215 may execute received commands according to an order (e.g., a first-in-first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265 (e.g., by the memory system controller 215) if the processing of the command has been completed (e.g., if data corresponding to the access command has been transferred out of the buffer 225). If a command is removed from the buffer queue 265, the address previously storing the data associated with that command may be available to store data associated with a new command.

In some examples, the memory system controller 215 may be configured for operations associated with one or more memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. For example, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

In accordance with examples as disclosed herein, the memory system 210 may support generating combined blocks using HGBs of the memory device 240 and replacing bad blocks with the combined blocks. For example, the memory system 210 may construct a combined block using an upper HGB of the memory device 240 and a lower HGB of the memory device 240. In some cases, the memory system 210 may generate the combined blocks to replace the bad blocks based on (e.g., in response to) an absence of good blocks in a block pool. In some such cases, the memory system 210 may support creating a second block pool configured to store the combined blocks, and the memory system 210 may select the combined blocks from the second block pool to replace the bad blocks. By supporting replacing bad blocks with combined blocks, the memory system 210 may benefit from a relatively greater duration before reaching an EOL state (e.g., compared to previous implementations), thereby preventing the memory device 240 from switching to a read-only mode over the relatively greater duration.

Figure 3:
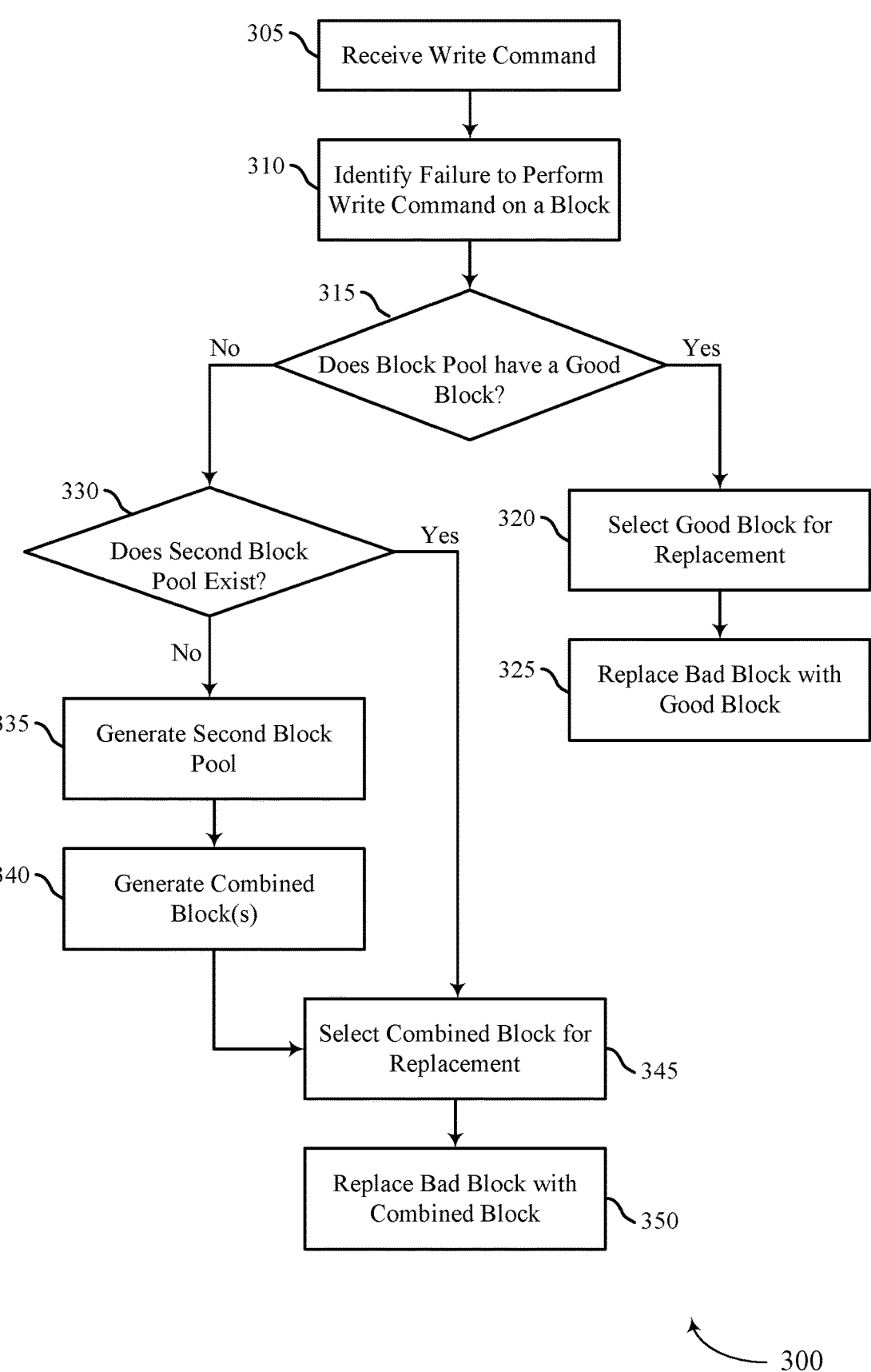
FIG. 3 illustrates an example of a process flow that supports block replacement using combined blocks in accordance with examples as disclosed herein.

FIG. 3 illustrates an example of a process flow 300 that supports block replacement using combined blocks in accordance with examples as disclosed herein. The process flow 300 may illustrate aspects or operations of a system 100 or a system 200 as described with reference to FIGS. 1 and 2, respectively. For example, the process flow 300 may depict operations at a memory system, which may be an example of a memory system 110 or a memory system 210, as described with reference to FIGS. 1 and 2, respectively. In the following description of the process flow 300, the methods, techniques, processes, and operations may be performed in different orders or at different times. Further, certain operations may be left out of the process flow 300, or other operations may be added to the process flow 300. In accordance with operations as disclosed herein, the memory system may be configured to replace bad blocks of the memory system with combined blocks constructed from HGBs, based on (e.g., in response to) identifying an absence of good blocks. By supporting replacing the bad blocks with combined blocks, the memory system may benefit from a relatively increased programmable life (e.g., compared to prior implementations).

The memory system described herein may include a memory system controller, which may be an example of a memory system controller 215, as described with reference to FIG. 2. In some cases, the memory system controller may be configured to perform operations on the memory system in accordance with commands received from a host system coupled with the memory system. Additionally, the memory system may include one or more memory dies, which may be examples of memory devices 130 or memory devices 240, as described with reference to FIGS. 1 and 2, respectively. Each memory die may include one or more memory arrays of non-volatile memory (e.g., NAND memory). The memory arrays may include blocks of memory cells (e.g., NAND memory cells) accessible via word lines (e.g., functional word lines) associated with the blocks.

In some cases, the memory arrays may include one or more bad blocks. Each bad block may be associated with a quantity of failures to perform access operations (e.g., write operations, erase operations), where the quantity of failures satisfies a threshold. In some examples, the memory system may determine a block is a bad block based on (e.g., in response to) identifying one or more failures to perform one or more access operations. In some cases, the memory arrays may also include one or more good blocks. Each good block may be associated with a quantity of failures to perform access operations, where the quantity of failures does not satisfy a threshold. In some examples, the memory system may assume a block is a good block until the block fails a quantity of access operations or fails a quantity of times of attempting to perform an access operation. In some cases, each block may be associated with a quantity of functional word lines (e.g., word lines capable of correctly writing to one or more memory cells), and a quantity of nonfunctional word lines (e.g., word lines incapable of correctly writing to one or more memory cells), which may determine whether a block is a good block or a bad block. For example, a good block may include a quantity of functional word lines satisfying a threshold, and a quantity of non-functional word lines not satisfying a threshold. Whereas, a bad block may include a quantity of functional word lines not satisfying a threshold, and a quantity of non-functional word lines satisfying a threshold. In some cases, the memory system controller may identify a block as a good block or a bad block by reading one-time programmable (OTP) pages of the memory system.

In some cases, the memory system may include a block pool, which may be a replacement table including mapping information for the good blocks of the memory system, or another data structure. In some examples, the block pool may be generated based on (e.g., in response to) reading the OTP pages to determine the good blocks of the memory system. In some cases, the memory system controller may reference the block pool to identify whether good blocks are present in the memory system. In some such cases, the memory system controller may reference the block pool to replace a bad block with a good block. Replacing a bad block with a good block may include identifying valid data from the bad block, copying the valid data to a good block in a same plane of a same memory die as the bad block, and mapping the good block to a same virtual block as the bad block. In some examples, replacing the bad block may additionally include unmapping the bad block from the virtual block.

In some cases, the memory arrays may include HGBs, where each HGB may be a block with a quantity of functional word lines in a region of the block, and a quantity of nonfunctional word lines in another region of the block. For example, an upper HGB may include a quantity of functional word lines satisfying a threshold in an upper region of the block, and a second quantity of functional word lines not satisfying the threshold in a lower region of the block. Further, a lower HGB may include a quantity of functional word lines satisfying a threshold in a lower region of the block, and a second quantity of functional word lines not satisfying the threshold, in an upper region of the block. In some such cases, the memory system controller may generate a combined block by logically combining an upper HGB with a lower HGB (e.g., two physical blocks) from a same plane of a same memory die. In some cases, the memory system controller may identify the HGBs in the one or more memory dies by reading OTP pages of the memory system.

In some cases, the memory system may include a second block pool, which may be a second replacement table including mapping information for the combined blocks of the memory system, or another data structure. For example, the second block pool may include the logical mappings corresponding to the upper HGB and the lower HGB constructing each combined block. In some examples, the second block pool may be generated based on reading the OTP pages to determine the HGBs of the memory system. In some cases, the memory system controller may reference the second block pool to identify whether combined blocks are present in the memory system. In some such cases, the memory system controller may reference the second block pool to replace a bad block with a combined block. Replacing a bad block with a combined block may include identifying valid data from the bad block, copying the valid data to a combined block (e.g., copying the valid data to functional portions of the two HGBs associated with the combined block) constructed from HGBs in a same plane of a same memory die as the bad block, and mapping the combined block to a same virtual block as the bad block. In some examples, replacing the bad block may additionally include unmapping the bad block from the virtual block.

At 305, the memory system controller may receive a write command from the host system. The write command may indicate the memory system controller to perform a write operation on a block of the memory system.

At 310, the memory system controller may identify a failure to perform the write operation on the block based on (e.g., in response to) receiving the write command. In some cases, failing to perform the write operation may be one failure of a quantity of failures to perform access operations (e.g., write operations, erase operations) on the block. In some cases, identifying the failure may include comparing the quantity of failures to a threshold and determining the quantity of failures satisfies the threshold. The memory system controller may designate the block as a bad block based on (e.g., in response to) identifying the failure.

At 315, the memory system controller may determine whether the block pool includes a good block (e.g., a second block) to replace the bad block based on identifying the failure to perform the write command on the bad block. For example, the memory system controller may check the block pool to determine whether there are one or more good blocks in a same plane of a same memory die as the bad block. In some cases, the memory system controller may determine a presence of one or more good blocks in the same plane of the same memory die as the bad block based on referencing the block pool, thereby indicating that the memory system includes a good block to replace the bad block. In some such cases, the process flow 300 may proceed to step 320. In other cases, the memory system controller may determine an absence of good blocks in the block pool or an absence of good blocks in the same plane of the same memory die as the bad block, thereby indicating that the memory system does not include a good block to replace the bad block. In some such cases, the process flow 300 may proceed to step 330.

At 320, the memory system controller may select a good block to replace the bad block based on (e.g., in response to) determining the block pool includes the good block. In some cases, the memory system controller may identify mapping information associated with the good block from the block pool to use during replacing the bad block.

At 325, the memory system controller may replace the bad block with the good block based on selecting the good block. In some cases, replacing the bad block may include identifying valid data from the bad block, copying the valid data to the good block, and mapping the good block to a same virtual block as the bad block.

At 330, the memory system controller may determine whether the second block pool exists in the memory system based on (e.g., in response to) determining the block pool does not include a good block. In some cases, the memory system controller may have not yet generated the second block pool due to good blocks (e.g., appropriate good blocks) previously existing in the block pool. In some such cases, the process flow 300 may proceed to step 335. In other cases, the memory system controller may have generated the second block pool due to identifying an absence of good blocks in the block pool. In some examples, the memory system controller may have generated one or more combined blocks using respective HGBs of the one or more memory dies and stored the mapping information corresponding to the one or more combined blocks in the second block pool. In some such cases, the process flow 300 may proceed to step 345.

At 335, the memory system controller may generate the second block pool based on determining the second block pool has not been created yet. In some example, generating the second block pool may include allocating a portion of the one or more memory dies, a portion of volatile storage at a separate memory die, or a portion of local storage at the memory system controller for storing the second block pool.

At 340, the memory system controller may generate one or more combined blocks based on generating the second block pool. In some cases, the memory system controller may generate a quantity of combined blocks based on identifying a desire to replace a quantity of bad blocks. For example, because a singular bad block was identified at step 310, the memory system controller may generate a singular combined block with two HGBs in the same plane of the same memory die as the bad block. In some such examples, the memory system controller may select an upper HGB (e.g., a third block) and a lower HGB (e.g., a fourth block) to generate the combined block. In some implementations, selecting the upper HGB and the lower HGB may include determining that a first quantity of functional word lines associated with a portion (e.g., an upper region) of the upper HGB satisfies a threshold, and determining that a second quantity of functional word lines associated with a portion (e.g., a lower region) of the lower HGB satisfies the threshold. In other cases, the memory system controller may generate a quantity of combined blocks, wherein the quantity is dependent on the quantity of HGBs in the one or more memory dies. For example, the memory system controller may create a quantity of combined blocks based on identifying corresponding quantities of upper HGBs and lower HGBs (e.g., each of which in a same respective plane of a same respective memory die). In some examples, the memory system controller may generate a quantity of combined blocks based on a size of the second block pool (e.g., based on a size of the allocated portion for storing the second block pool).

At 345, the memory system controller may select a combined block to replace the bad block based on determining the second block pool has been created at step 330 or based on generating the one or more combined blocks at step 340. In some cases, the memory system controller may identify mapping information associated with the combined block from the second block pool to use during replacing the bad block.

At 350, the memory system controller may replace the bad block with the combined block based on (e.g., in response to) selecting the combined block. In some cases, replacing the bad block may include identifying valid data from the bad block, copying the valid data to the combined block (e.g., copying the valid data to the respective HGBs associated with the combined block), and mapping the combined block to the same virtual block as the bad block.

Performing the operations of the process flow 300 as described herein, may be associated with supporting a relatively extended lifespan of the memory system compared to prior implementations. For example, implementing the combined blocks to replace bad blocks in response to appropriate good blocks being absent from the memory system, may extend a duration before the one or more memory dies enter an EOL state and thus a read-only mode. Therefore, implementing the combined blocks for block replacement as disclosed herein may extend an accessible life of the memory system.

Figure 4:
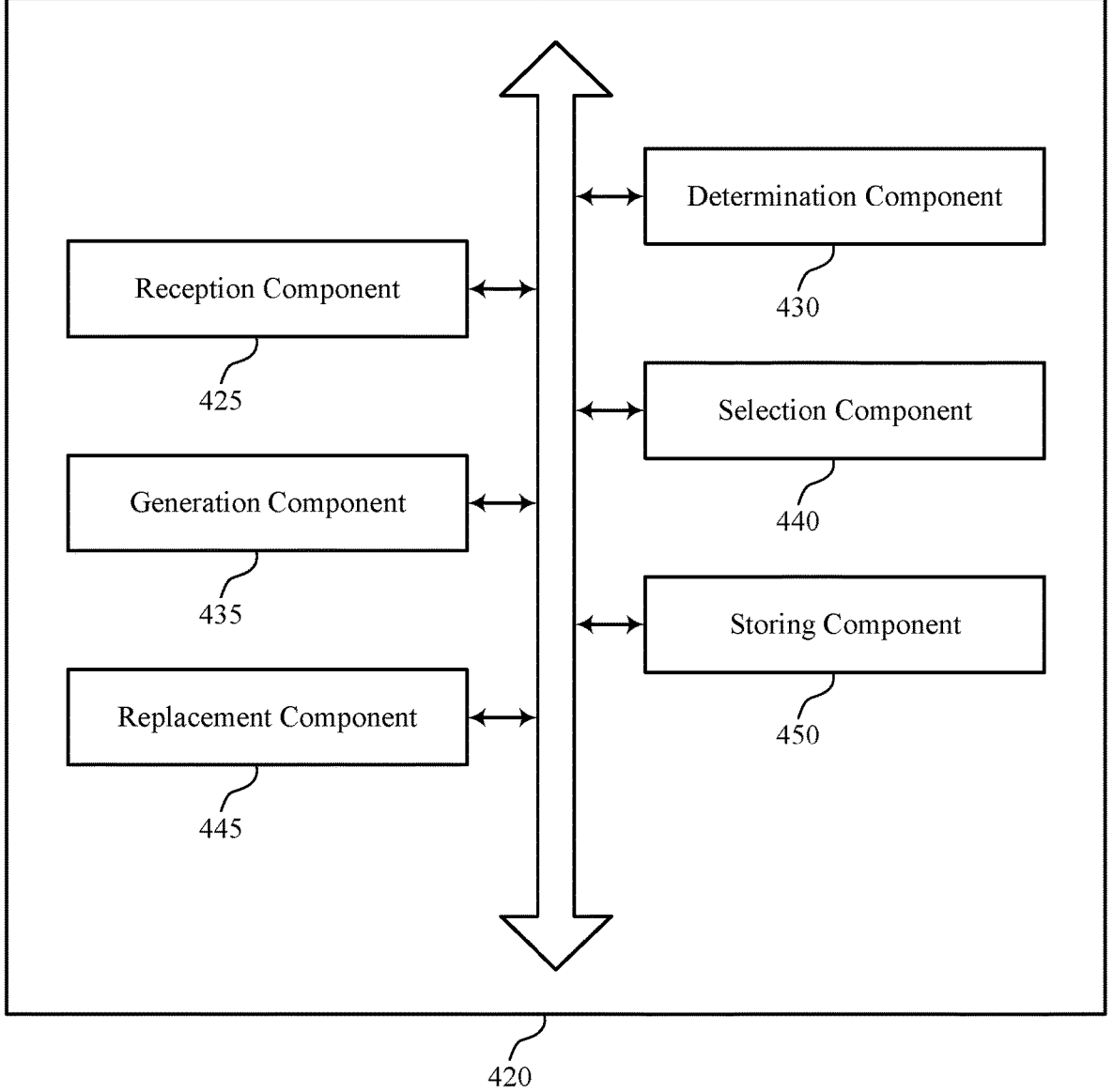
FIG. 4 illustrates a block diagram of a memory system that supports block replacement using combined blocks in accordance with examples as disclosed herein.

FIG. 4 illustrates a block diagram 400 of a memory system 420 that supports block replacement using combined blocks in accordance with examples as disclosed herein. The memory system 420 may be an example of aspects of a memory system as described with reference to FIGS. 1 through 3. The memory system 420, or various components thereof, may be an example of means for performing various aspects of block replacement using combined blocks as described herein. For example, the memory system 420 may include a reception component 425, a determination component 430, a generation component 435, a selection component 440, a replacement component 445, a storing component 450, or any combination thereof. Each of these components may communicate, directly or indirectly, with one another (e.g., via one or more buses).

The reception component 425 may be configured as or otherwise support a means for receiving a command to perform an operation on a first block of a virtual block of a memory system. The determination component 430 may be configured as or otherwise support a means for determining whether a block pool of the memory system includes a second block for replacing the first block of the virtual block of the memory system based at least in part on a failure to perform the operation on the first block, where the first block and the second block are in a same plane of the memory system. The generation component 435 may be configured as or otherwise support a means for generating a combined block for replacing the first block of the virtual block of the memory system based at least in part on determining an absence of the second block in the block pool, where the combined block includes a portion of a third block of the memory system and a portion of a fourth block of the memory system, where the first block, the third block, and the fourth block are in the same plane of the memory system.

In some examples, the selection component 440 may be configured as or otherwise support a means for selecting the combined block for replacing the first block of the virtual block of the memory system based at least in part on generating the combined block. In some examples, the replacement component 445 may be configured as or otherwise support a means for replacing the first block of the virtual block of the memory system with the combined block based at least in part on selecting the combined block.

In some examples, to support replacing the first block of the virtual block of the memory system, the replacement component 445 may be configured as or otherwise support a means for copying valid data from the first block of the virtual block of the memory system to the combined block. In some examples, to support replacing the first block of the virtual block of the memory system, the replacement component 445 may be configured as or otherwise support a means for mapping the combined block to the virtual block of the memory system.

In some examples, the determination component 430 may be configured as or otherwise support a means for determining whether the memory system includes a second block pool including one or more combined blocks, where generating the combined block is based at least in part on determining an absence of the second block pool at the memory system.

In some examples, the generation component 435 may be configured as or otherwise support a means for generating the second block pool based at least in part on determining the absence of the second block pool at the memory system. In some examples, the storing component 450 may be configured as or otherwise support a means for storing the combined block in the second block pool based at least in part on generating the second block pool.

In some examples, the generation component 435 may be configured as or otherwise support a means for generating a second combined block based at least in part on generating the second block pool, where the second combined block includes a portion of a fifth block of the memory system and a portion of a sixth block of the memory system, where the first block, the third block, the fourth block, the fifth block, and the sixth block are in the same plane of the memory system. In some examples, the storing component 450 may be configured as or otherwise support a means for storing the second combined block in the second block pool based at least in part on generating the second combined block.

In some examples, to support generating the combined block, the selection component 440 may be configured as or otherwise support a means for selecting the third block of the memory system and the fourth block of the memory system for the combined block based at least in part on performing a read operation on a set of OTP pages of the memory system.

In some examples, the determination component 430 may be configured as or otherwise support a means for determining whether a first quantity of functional word lines associated with the portion of the third block of the memory system satisfies a threshold. In some examples, the determination component 430 may be configured as or otherwise support a means for determining whether a second quantity of functional word lines associated with the portion of the fourth block of the memory system satisfies the threshold. In some examples, the selection component 440 may be configured as or otherwise support a means for selecting the third block and the fourth block for generating the combined block based at least in part on the determination component 430 determining that the first quantity of functional word lines and the second quantity of functional word lines each satisfy the threshold.

In some examples, the portion of the third block of the memory system is associated with an upper region of the third block of the memory system, and the portion of the fourth block of the memory system is associated with a lower region of the fourth block of the memory system.

In some examples, the combined block is a logical block configured from two physical blocks of the memory system, the two physical blocks being the third block and the fourth block of the memory system.

In some examples, the third block and the fourth block of the memory system are HGBs.

In some examples, the block pool of the memory system corresponds to a table including a set of blocks for replacing one or more block associated with a respective virtual block of the memory system.

FIG. 5 illustrates a flowchart showing a method 500 that supports block replacement using combined blocks in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include receiving a command to perform an operation on a first block of a virtual block of a memory system. The operations of 505 may be performed in accordance with examples as disclosed herein. In some examples, aspects of the operations of 505 may be performed by a reception component 425 as described with reference to FIG. 4.

At 510, the method may include determining whether a block pool of the memory system includes a second block for replacing the first block of the virtual block of the memory system based at least in part on a failure to perform the operation on the first block, where the first block and the second block are in a same plane of the memory system. The operations of 510 may be performed in accordance with examples as disclosed herein. In some examples, aspects of the operations of 510 may be performed by a determination component 430 as described with reference to FIG. 4.

At 515, the method may include generating a combined block for replacing the first block of the virtual block of the memory system based at least in part on determining an absence of the second block in the block pool, where the combined block includes a portion of a third block of the memory system and a portion of a fourth block of the memory system, where the first block, the third block, and the fourth block are in the same plane of the memory system. The operations of 515 may be performed in accordance with examples as disclosed herein. In some examples, aspects of the operations of 515 may be performed by a generation component 435 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving a command to perform an operation on a first block of a virtual block of a memory system; determining whether a block pool of the memory system includes a second block for replacing the first block of the virtual block of the memory system based at least in part on a failure to perform the operation on the first block, where the first block and the second block are in a same plane of the memory system; and generating a combined block for replacing the first block of the virtual block of the memory system based at least in part on determining an absence of the second block in the block pool, where the combined block includes a portion of a third block of the memory system and a portion of a fourth block of the memory system, where the first block, the third block, and the fourth block are in the same plane of the memory system.

Aspect 2: The method, apparatus, or non-transitory computer-readable medium of aspect 1, further including operations, features, circuitry, logic, means, or instructions, or any combination thereof for selecting the combined block for replacing the first block of the virtual block of the memory system based at least in part on generating the combined block and replacing the first block of the virtual block of the memory system with the combined block based at least in part on selecting the combined block.

Aspect 3: The method, apparatus, or non-transitory computer-readable medium of aspect 2, where replacing the first block of the virtual block of the memory system includes operations, features, circuitry, logic, means, or instructions, or any combination thereof for copying valid data from the first block of the virtual block of the memory system to the combined block and mapping the combined block to the virtual block of the memory system.

Aspect 4: The method, apparatus, or non-transitory computer-readable medium of any of aspects 1 through 3, further including operations, features, circuitry, logic, means, or instructions, or any combination thereof for determining whether the memory system includes a second block pool including one or more combined blocks, where generating the combined block is based at least in part on determining an absence of the second block pool at the memory system.

Aspect 5: The method, apparatus, or non-transitory computer-readable medium of aspect 4, further including operations, features, circuitry, logic, means, or instructions, or any combination thereof for generating the second block pool based at least in part on determining the absence of the second block pool at the memory system and storing the combined block in the second block pool based at least in part on generating the second block pool.

Aspect 6: The method, apparatus, or non-transitory computer-readable medium of aspect 5, further including operations, features, circuitry, logic, means, or instructions, or any combination thereof for generating a second combined block based at least in part on generating the second block pool, where the second combined block includes a portion of a fifth block of the memory system and a portion of a sixth block of the memory system, where the first block, the third block, the fourth block, the fifth block, and the sixth block are in the same plane of the memory system and storing the second combined block in the second block pool based at least in part on generating the second combined block.

Aspect 7: The method, apparatus, or non-transitory computer-readable medium of any of aspects 1 through 6, where generating the combined block includes operations, features, circuitry, logic, means, or instructions, or any combination thereof for selecting the third block of the memory system and the fourth block of the memory system for the combined block based at least in part on performing a read operation on a set of OTP pages of the memory system.

Aspect 8: The method, apparatus, or non-transitory computer-readable medium of any of aspects 1 through 7, further including operations, features, circuitry, logic, means, or instructions, or any combination thereof for determining whether a first quantity of functional word lines associated with the portion of the third block of the memory system satisfies a threshold; determining whether a second quantity of functional word lines associated with the portion of the fourth block of the memory system satisfies the threshold;

and where selecting the third block and the fourth block for generating the combined block is based at least in part on determining that the first quantity of functional word lines and the second quantity of functional word lines each satisfy the threshold.

Aspect 9: The method, apparatus, or non-transitory computer-readable medium of any of aspects 1 through 8, where the portion of the third block of the memory system is associated with an upper region of the third block of the memory system, and the portion of the fourth block of the memory system is associated with a lower region of the fourth block of the memory system.

Aspect 10: The method, apparatus, or non-transitory computer-readable medium of any of aspects 1 through 9, where the combined block is a logical block configured from two physical blocks of the memory system, the two physical blocks being the third block and the fourth block of the memory system.

Aspect 11: The method, apparatus, or non-transitory computer-readable medium of any of aspects 1 through 10, where the third block and the fourth block of the memory system are HGBs.

Aspect 12: The method, apparatus, or non-transitory computer-readable medium of any of aspects 1 through 11, where the block pool of the memory system corresponds to a table including a set of blocks for replacing one or more block associated with a respective virtual block of the memory system.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a memory system comprising a virtual block; and
   a controller coupled with the memory system and configured to cause the apparatus to:
   receive a command to perform an operation on a first block of the virtual block of the memory system;
   determine whether a block pool of the memory system comprises a second block for replacing the first block of the virtual block of the memory system based at least in part on a failure to perform the operation on the first block, wherein the first block and the second block are in a same plane of the memory system; and generate a combined block for replacing the first block of the virtual block of the memory system based at least in part on determining an absence of the second block in the block pool, wherein the combined block comprises a portion of a third block of the memory system and a portion of a fourth block of the memory system, wherein the first block, the third block, and the fourth block are in the same plane of the memory system.

2. The apparatus of claim 1, wherein the controller is further configured to cause the apparatus to:

select the combined block for replacing the first block of the virtual block of the memory system based at least in part on generating the combined block; and replace the first block of the virtual block of the memory system with the combined block based at least in part on selecting the combined block.

3. The apparatus of claim 2, wherein replacing the first block of the virtual block of the memory system is configured to cause the apparatus to:

copy valid data from the first block of the virtual block of the memory system to the combined block; and map the combined block to the virtual block of the memory system.

4. The apparatus of claim 1, wherein the controller is further configured to cause the apparatus to:

determine whether the memory system comprises a second block pool comprising one or more combined blocks, wherein to generate the combined block is based at least in part on determining the absence of the second block pool at the memory system.

5. The apparatus of claim 4, wherein the controller is further configured to cause the apparatus to:

generate the second block pool based at least in part on determining the absence of the second block pool at the memory system; and store the combined block in the second block pool based at least in part on generating the second block pool.

6. The apparatus of claim 5, wherein the controller is further configured to cause the apparatus to:

generate a second combined block based at least in part on generating the second block pool, wherein the second combined block comprises a portion of a fifth block of the memory system and a portion of a sixth block of the memory system, wherein the first block, the third block, the fourth block, the fifth block, and the sixth block are in the same plane of the memory system; and store the second combined block in the second block pool based at least in part on generating the second combined block.

7. The apparatus of claim 1, wherein generating the combined block is configured to cause the apparatus to:

select the third block of the memory system and the fourth block of the memory system for the combined block based at least in part on performing a read operation on a set of one-time programmable (OTP) pages of the memory system.

8. The apparatus of claim 1, wherein the controller is further configured to cause the apparatus to:

determine whether a first quantity of functional word lines associated with the portion of the third block of the memory system satisfies a threshold; and determine whether a second quantity of functional word lines associated with the portion of the fourth block of the memory system satisfies the threshold, wherein to select the third block and the fourth block for generating the combined block is based at least in part on determining that the first quantity of functional word lines and the second quantity of functional word lines each satisfy the threshold.

9. The apparatus of claim 1, wherein the portion of the third block of the memory system is associated with an upper region of the third block of the memory system, and the portion of the fourth block of the memory system is associated with a lower region of the fourth block of the memory system.

10. The apparatus of claim 1, wherein the combined block is a logical block configured from two physical blocks of the memory system, the two physical blocks being the third block and the fourth block of the memory system.

11. The apparatus of claim 1, wherein the third block and the fourth block of the memory system are half good blocks.

12. The apparatus of claim 1, wherein the block pool of the memory system corresponds to a table comprising a set of blocks for replacing one or more block associated with a respective virtual block of the memory system.

13. A non-transitory computer-readable medium storing code comprising instructions which, when executed by a processor of an electronic device, cause the electronic device to:

receive a command to perform an operation on a first block of a virtual block of a memory system;

determine whether a block pool of the memory system comprises a second block for replacing the first block of the virtual block of the memory system based at least in part on a failure to perform the operation on the first block, wherein the first block and the second block are in a same plane of the memory system; and generate a combined block for replacing the first block of the virtual block of the memory system based at least in part on determining an absence of the second block in the block pool, wherein the combined block comprises a portion of a third block of the memory system and a portion of a fourth block of the memory system, wherein the first block, the third block, and the fourth block are in the same plane of the memory system.

14. The non-transitory computer-readable medium of claim 13, wherein the instructions, when executed by the processor of the electronic device, further cause the electronic device to:

select the combined block for replacing the first block of the virtual block of the memory system based at least in part on generating the combined block; and replace the first block of the virtual block of the memory system with the combined block based at least in part on selecting the combined block.

15. The non-transitory computer-readable medium of claim 14, wherein the instructions, to replace the first block of the virtual block of the memory system, when executed by the processor of the electronic device, further cause the electronic device to:

copy valid data from the first block of the virtual block of the memory system to the combined block; and map the combined block to the virtual block of the memory system.

16. The non-transitory computer-readable medium of claim 13, wherein the instructions, when executed by the processor of the electronic device, further cause the electronic device to:

determine whether the memory system comprises a second block pool comprising one or more combined blocks, wherein to generate the combined block is based at least in part on determining the absence of the second block pool at the memory system.

17. The non-transitory computer-readable medium of claim 16, wherein the instructions, when executed by the processor of the electronic device, further cause the electronic device to:

generate the second block pool based at least in part on determining the absence of the second block pool at the memory system; and store the combined block in the second block pool based at least in part on generating the second block pool.

18. The non-transitory computer-readable medium of claim 13, wherein the instructions to generate the combined block, when executed by the processor of the electronic device, further cause the electronic device to:

select the third block of the memory system and the fourth block of the memory system for the combined block based at least in part on performing a read operation on a set of one-time programmable (OTP) pages of the memory system.

19. The non-transitory computer-readable medium of claim 13, wherein the instructions, when executed by the processor of the electronic device, further cause the electronic device to:

determine whether a first quantity of functional word lines associated with the portion of the third block of the memory system satisfies a threshold; and determine whether a second quantity of functional word lines associated with the portion of the fourth block of the memory system satisfies the threshold, wherein to select the third block and the fourth block for generating the combined block is based at least in part on determining that the first quantity of functional word lines and the second quantity of functional word lines each satisfy the threshold.

20. A method, comprising:

receiving a command to perform an operation on a first block of a virtual block of a memory system;

determining whether a block pool of the memory system comprises a second block for replacing the first block of the virtual block of the memory system based at least in part on a failure to perform the operation on the first block, wherein the first block and the second block are in a same plane of the memory system; and generating a combined block for replacing the first block of the virtual block of the memory system based at least in part on determining an absence of the second block in the block pool, wherein the combined block comprises a portion of a third block of the memory system and a portion of a fourth block of the memory system, wherein the first block, the third block, and the fourth block are in the same plane of the memory system.

* * * * *